United States Patent
Jamadagni

(10) Patent No.: US 8,934,392 B2
(45) Date of Patent: Jan. 13, 2015

(54) METHOD AND SYSTEM TO SUPPORT MULTIMEDIA BROADCAST MULTICAST SERVICE OVER GENERIC ACCESS NETWORKS

(75) Inventor: Satish Nanjunda Swamy Jamadagni, Byrasandra (IN)

(73) Assignee: Samsung Electronics Co., Ltd (KR)

( * ) Notice: Subject to any disclaimer, the term of this patent is extended or adjusted under 35 U.S.C. 154(b) by 334 days.

(21) Appl. No.: 13/061,570

(22) PCT Filed: Sep. 23, 2009

(86) PCT No.: PCT/KR2009/005418
§ 371 (c)(1),
(2), (4) Date: Mar. 1, 2011

(87) PCT Pub. No.: WO2010/036019
PCT Pub. Date: Apr. 1, 2010

(65) Prior Publication Data
US 2011/0149834 A1 Jun. 23, 2011

(30) Foreign Application Priority Data
Sep. 26, 2008 (IN) .......................... 2363/CHE/2008

(51) Int. Cl.
*H04H 20/71* (2008.01)
*H04W 72/00* (2009.01)
(Continued)

(52) U.S. Cl.
CPC .......... *H04W 72/005* (2013.01); *H04W 72/042* (2013.01); *H04W 48/10* (2013.01)
USPC ........... 370/312; 370/338; 370/349; 455/436; 725/62

(58) Field of Classification Search
CPC . H04W 84/045; H04W 12/08; H04W 76/022; H04W 60/04; H04W 36/0055
USPC ............ 370/312, 338, 349; 455/432.1, 435.2, 455/436; 725/62
See application file for complete search history.

(56) References Cited

U.S. PATENT DOCUMENTS

2005/0043035 A1   2/2005   Diesen et al.
2005/0111395 A1   5/2005   Hwang et al.
(Continued)

FOREIGN PATENT DOCUMENTS

KR   1020070023230   2/2007
KR   1020080018148   2/2008

OTHER PUBLICATIONS

English translation of WO/2008/025239, "Evolved-MBMS Base Station, User Equipment and Method", Jun. 3, 2008.*
(Continued)

*Primary Examiner* — Jung Park
(74) *Attorney, Agent, or Firm* — The Farrell Law Firm, P.C.

(57) ABSTRACT

A method and system for supporting multimedia broadcast multicast service over a generic access network is provided. The method includes utilizing one or more channels to perform one or more application procedures in a multimedia broadcast multicast service (MBMS). The method also includes establishing an MBMS bearer for the MBMS over the generic access network by delivering an MBMS notification comprising generic access network cell description. The MBMS notification is delivers via the one or more of channels. Further, the method includes directing an electronic device to a generic access network cell based on the delivered MBMS notification. The system includes an electronic device. The system also includes a mobile station for rendering multiple mobile services to the electronic device. Further, the system includes a base station in communication with the mobile station for establishing an MBMS bearer in the generic access network for supporting the multimedia broadcast multicast service.

10 Claims, 3 Drawing Sheets

(51) Int. Cl.
*H04W 72/04* (2009.01)
*H04W 48/10* (2009.01)

(56) References Cited

U.S. PATENT DOCUMENTS

2007/0105557 A1* 5/2007 Israelsson et al. ............ 455/436
2008/0181158 A1* 7/2008 Bouazizi et al. .............. 370/312
2009/0061877 A1* 3/2009 Gallagher et al. ............ 455/436
2009/0265542 A1* 10/2009 Khetawat et al. ............. 713/151

OTHER PUBLICATIONS

PCT/ISA/237 Written Opinion issued on PCT/KR2009/005418 (5 pp.).
PCT/ISA/210 Search Report issued on PCT/KR2009/005418 (4 pp.).

* cited by examiner

METHOD AND SYSTEM TO SUPPORT MULTIMEDIA BROADCAST MULTICAST SERVICE OVER GENERIC ACCESS NETWORKS

PRIORITY

This application claims priority to International Appl. No.: PCT/KR2009/005418 filed Sep. 23, 2009, and to Indian Patent Application No. 2363/CHE/2008 filed on Sep. 26, 2008, the disclosure of each of which is hereby incorporated by reference.

TECHNICAL FIELD

The present disclosure relates generally to the field of multimedia communication. More particularly, the present disclosure relates to a method and a system for supporting multimedia broadcast multicast service over generic access networks.

BACKGROUND ART

Multimedia broadcast multicast service (MBMS) is a broadcasting service rendered over global system for mobile communications (GSM) and universal mobile telecommunication system (UTMS) cellular networks. The MBMS uses both broadcast and multicast modes of operation. The MBMS provides point-to-multi-point transmissions of multimedia data, for example text, audio, and video, from a single point source to a broadcast area or to a multicast group over a radio interface. The MBMS uses visual data and associated audio data in a suitable form. Further, the multimedia data can be delivered on-demand or at a scheduled time via MBMS.

Implementation of the MBMS over a global system for mobile communications edge radio access network (GE-RAN) is difficult due to bandwidth considerations. Also, the MBMS is not supported over second generation mobile telecommunication technology (2G) networks and third generation mobile telecommunication technology (3G) networks owing to bandwidth constraints.

DISCLOSURE OF INVENTION

Technical Problem

However, generic access networks (GAN) have required bandwidth to support multimedia services. Hence, there is a need to support signaling of the MBMS over the GAN since existing signaling used for the UMTS and the GERAN is not applicable to GAN.

In light of the foregoing discussion, there is a need for a method and a system for supporting multimedia broadcast service over a generic access network.

Solution to Problem

Embodiments of the present disclosure described herein provide a method and system for supporting multimedia broadcast multicast service through a generic access network.

An example of a method for supporting multimedia broadcast service over a generic access network includes utilizing one or more of channels to perform one or more application procedures in a multimedia broadcast multicast service (MBMS). The method also includes establishing an MBMS bearer for supporting MBMS over the generic access network. The MBMS bearer is established by one of delivering an MBMS notification including generic access network cell description via the one or more of the channels. Further, the method includes directing an electronic device to a generic access network cell based on the delivered MBMS notification.

An example of a system for supporting multimedia broadcast multicast service over a generic access network includes an electronic device. The system also includes a mobile station for providing a plurality of services to the electronic device. Further, the system includes a base station in communication with the mobile station for establishing an MBMS bearer in the generic access network to support the multimedia broadcast multicast service.

Advantageous Effects of Invention

The prevent invention can support multimedia broadcast service over a generic access network.

BRIEF DESCRIPTION OF DRAWINGS

The accompanying figures, similar reference numerals may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

MODE FOR THE INVENTION

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for supporting multimedia broadcast multicast service over a generic access network.

The generic access network (GAN) is a telecommunication system extending to mobile voice, data and internet protocol multimedia subsystem or session initiation protocol applications over internet protocol access networks.

In various embodiments, the GAN can be replaced with a femtocell.

Figure 1:
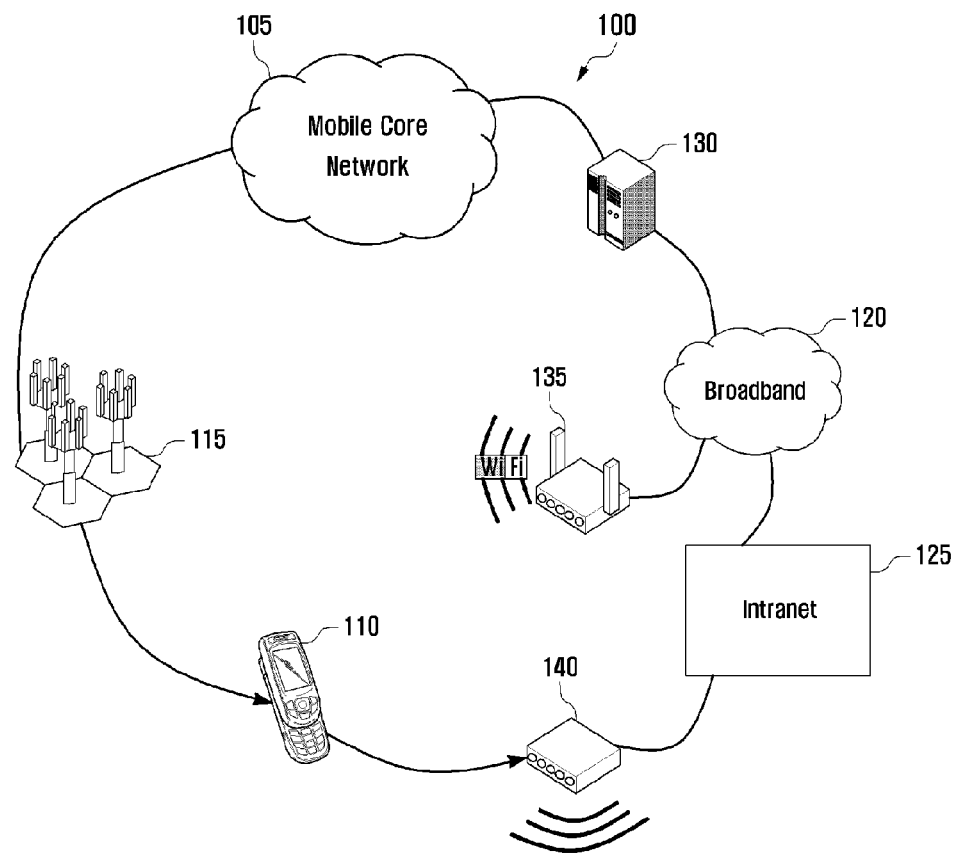
FIG. 1 is a block diagram of an environment, in accordance with which various embodiments can be implemented.

FIG. 1 is a block diagram of an environment 100, in accordance with which various embodiments can be implemented. The environment 100 includes an electronic device 110. In one embodiment, the electronic device is a multimedia device. Examples of the electronic device 110 include, but are not limited to a computer, a laptop, a mobile device, a hand held device, and a personal digital assistant (PDA). Further, the environment 100 includes a mobile core network 105 that provides multiple services, for example a call service, a messaging service, to the electronic device 110 via a cellular network 115. Examples of the cellular network 115 include, but are not limited to, global system for mobile communications edge radio access network (GERAN), universal mobile telecommunication system terrestrial radio access network (UTRAN), long term evolution (LTE), and worldwide interoperability for microwave access (Wimax).

The cellular network 115 includes multiple base stations, using different terrestrial air interface standards and frequency bands. The cellular network 115 also includes multiple channels. The environment 100 also includes a broadband network 120 for providing internet services to devices in an intranet 125 via a network adapter 135. The environment 100 further includes an unlicensed mobile access (UMA) controller also called a generic access network (GAN) controller 130 for enabling cellular services. The GAN controller 130 provide alternative access to global system for mobile communications (GSM) and general packet radio service (GPRS) core network services via internet protocol based broadband connections. Examples of the broadband network 120 include, but are not limited to, Internet Protocol Multimedia Subsystem (IMS), session initiation protocol (SIP) based system or any other wired or wireless network. A mobile station of the cellular network 115 in communication with the GAN controller 130 intimates availability of MBMS service in a GAN. The environment 100 also includes a GAN cell 140. The electronic device 110 is directed to the GAN cell 140 on establishing an MBMS bearer within the GAN and on detecting an available MBMS service in the GAN cell 140.

Figure 2:
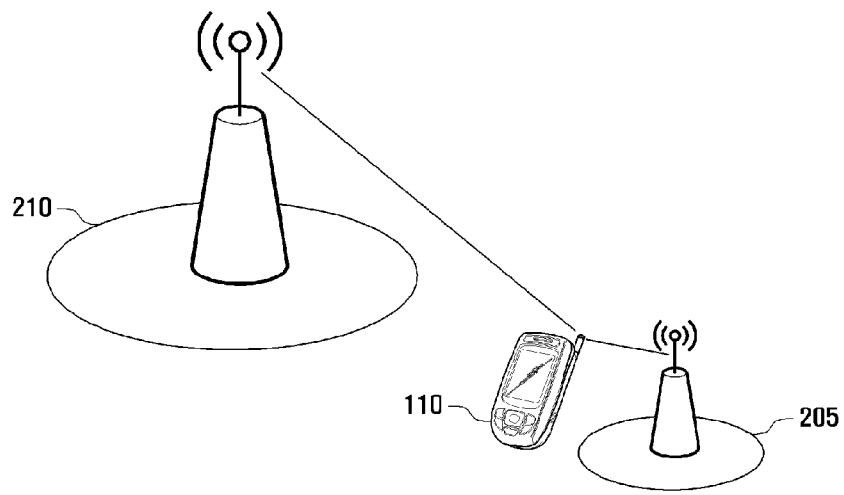
FIG. 2 illustrates a system to support multimedia broadcast multicast service (MBMS) over a generic access network (GAN), in accordance with one embodiment.

FIG. 2 illustrates a system to support MBMS over a generic access network (GAN), in accordance with one embodiment. The system includes an electronic device 110, a mobile station 205, and a base station 210. The mobile station 205 renders multiple services to the electronic device 110. Examples of the services include, but are not limited to, call services and messaging services. The base station 210 in communication with the mobile station 205 establishes an MBMS bearer in the GAN for supporting the multimedia broadcast multicast service.

Figure 3:
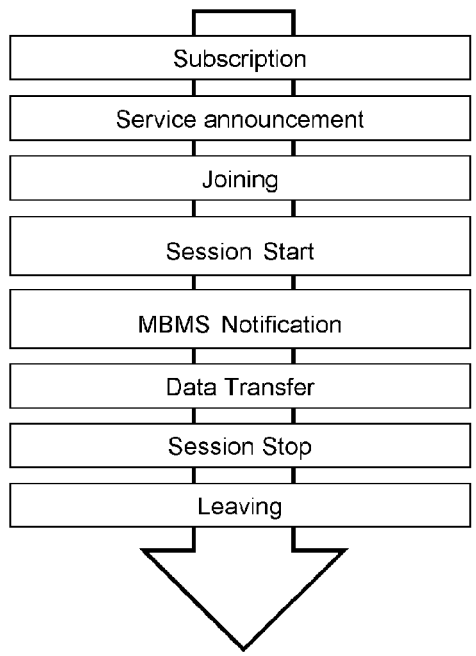
FIG. 3 is a flow diagram illustrating various procedures followed for providing MBMS to an electronic device, in accordance with one embodiment.

FIG. 3 illustrates a flow diagram of MBMS over a GAN, in accordance with one embodiment. One or more cellular channels within a macro cell are utilized for performing various application procedures for MBMS signaling. The macro cell includes one or more channels, for example a global system for mobile communications edge radio access network (GERAN) channel, a universal mobile telecommunication system terrestrial radio access network (UTRAN) channel, a long term evolution (LTE) channel, and a worldwide interoperability for microwave access (Wimax) channel. The application procedures herein refer to a sequential set of steps to be performed to subscribe to the MBMS and to initiate an MBMS signaling session. Examples of the application procedures include, but are not limited to, subscription, service announcement, joining, and session start. The other application procedures required for MBMS signaling are performed within the MBMS bearer established for supporting the MBMS within the GAN. An MBMS notification including GAN cell description is delivered over the channels within the macro cell. The MBMS notification is enhanced to include information for directing the electronic device from the macro cell to the GAN cell. Further, the MBMS notification is used to establish the MBMS bearer for supporting the MBMS over the GAN. Also, multiple session update messages are continuously broadcasted over the channels to direct the electronic device into the GAN cell.

Figure 4:
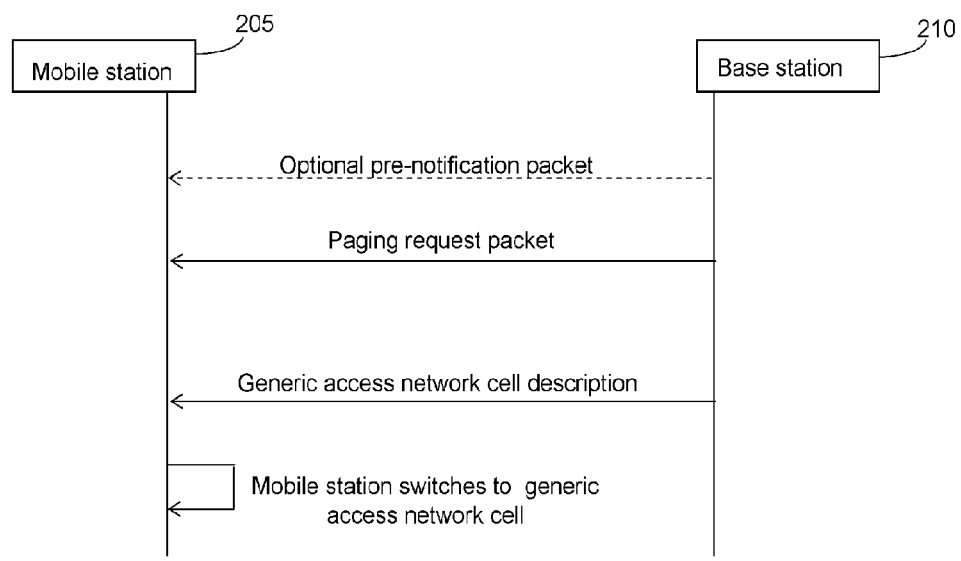
FIG. 4 is a flow diagram illustrating establishment of an MBMS bearer to support multimedia broadcast multicast service over a generic access network, in accordance with one embodiment.

FIG. 4 is a flow diagram illustrating establishment of the MBMS bearer to support the MBMS over the GAN, when the electronic device is in an inactive mode. In order to deliver the MBMS notification, a paging request is transferred from the base station 210 to the mobile station 205, if the mobile station 205 is located within the GAN. The paging request can include a temporary group identifier (TMGI), an MBMS session identifier, and an available bearer indicator on the GAN. In some embodiments, an optional pre-notification packet is transferred from the base station 210 to the mobile station 205, prior to transferring the paging request. The optional pre-notification packet can include the TMGI and the MBMS session identifier. After transferring the paging request, a GAN cell description is transferred from the base station 210 to the mobile station 205 to establish the MBMS bearer. The mobile station 205 then switches to the GAN cell based on the GAN cell description.

Figure 5:
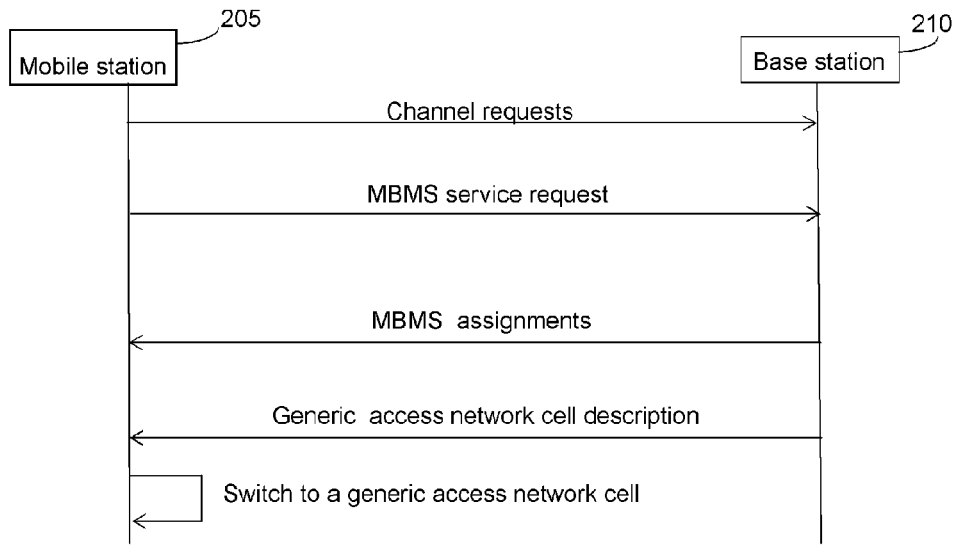
FIG. 5 is a flow diagram illustrating an MBMS assignment procedure for indicating availability of an MBMS bearer in a generic access network, in accordance with one embodiment.

FIG. 5 is a flow diagram illustrating an MBMS assignment procedure for indicating availability of the MBMS bearer in the GAN, when the electronic device is in an active mode. One or more channel requests are transferred from the mobile station 205 to the base station 210 requesting for available channels in the GAN. Examples of the channel requests include, but are not limited to, MBMS packet random access channel (MPRACH) requests. The channel requests are transferred to terminate receipt of one MBMS bearer and to search for the MBMS bearer of the GAN. The MPRACH requests use one or more of a packet access burst and an extended packet access burst. The mobile station 205 transfers an MBMS service request, for example to stop receiving MBMS bearer parameters, to the base station 210. Upon reception of the channel requests and the MBMS service request from the mobile station 205, the base station 210 transfers one or more MBMS assignments to the mobile station 205. Examples of the MBMS assignments include, but are not limited to an immediate assignment (AGCH), a packet access grant uplink assignment (PAGCH), and a packet uplink assignment (PACCH).

The MBMS assignments allocate one or more uplink radio blocks for MBMS access, or allocate an MBMS bearer. Also the base station 210 transfers the GAN cell description for allowing switching of the mobile station 210 from the channels to the MBMS bearer of the GAN. The GAN cell description includes, but is not limited to, a generic cell identifier, a location identifier, a cell group identifier, a service identifier, and a session indicator. In some embodiments, the generic cell identifier includes a geographic location identifier. The location identifier provides a geographic location of the GAN cell or a femtocell. The cell group identifier provides group identification of GAN cells where MBMS service is available. The service identifier identifies an available service in the GAN cell or the femtocell. The session indicator identifies a specific session associated with a specific MBMS session.

Each time the electronic device is directed to the GAN, the electronic device needs to delink from an associated network and register with the GAN to start an MBMS session. The mobile station 205 thereby switches to the GAN cell based on the GAN cell description.

Figure 6:
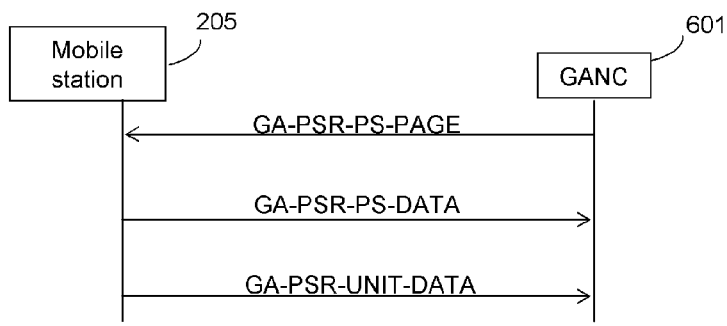
FIG. 6 is a flow diagram illustrating a packet switched service paging procedure in a generic access network to indicate start of an MBMS session, in accordance with one embodiment.

FIG. 6 exemplarily illustrate a paging procedure of a packet switched service in the GAN to indicate the start of the MBMS session. A GAN controller (GANC) 601 of the GAN communicates with the mobile station 205. The GANC 601 transfers a generic access packet switched resources packet switched page (GA-PSR-PS-PAGE) to the mobile station 205. The mobile station 205 responds to the GA-PSR-PS by transferring GA-PSR-PS data (GA-PSR-PS-DATA) to the GANC. The mobile station 205 subsequently transfers GA-PSR unit data (GA-PSR-UNIT-DATA) to the base station 210 to register with the GANC 601 and to start the MBMS session.

Figure 7:
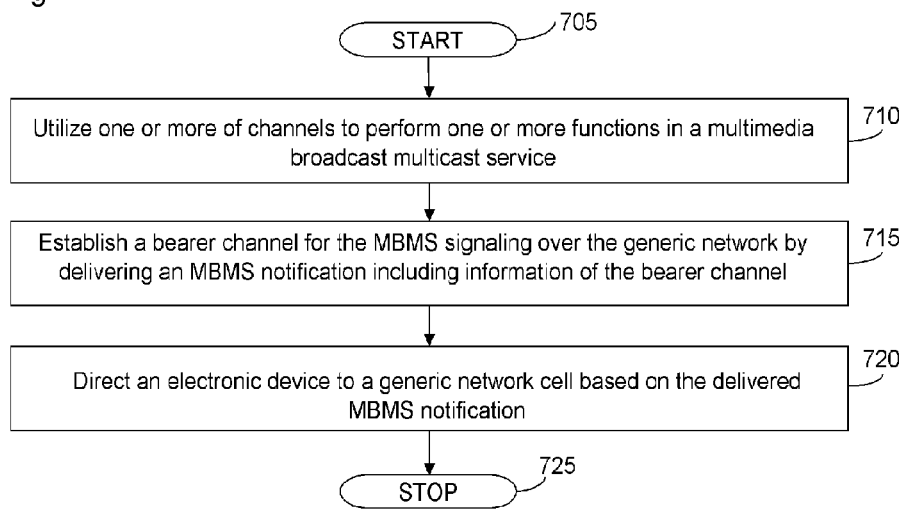
FIG. 7 is a flowchart illustrating a method for supporting multimedia broadcast multicast service over a generic access network, in accordance with one embodiment.

FIG. 7 is a flowchart illustrating a method for supporting multimedia broadcast multicast service over a generic access network (GAN).

The method starts at step 705.

At step 710, one or more channels are utilized to perform one or more application procedures in the multimedia broadcast multicast service (MBMS). Examples of the channels include, but are not limited to, global system for mobile communications edge radio access network (GERAN) channels and universal mobile telecommunication system terrestrial radio access network (UTRAN) channels, long term evolution (LTE) channels, and worldwide interoperability for microwave access (Wimax) channels. Examples of the application procedures include, but are not limited to, broadcasting a service announcement to an electronic device.

At step 715, an MBMS bearer is established for the MBMS over the GAN. The MBMS bearer can be established by delivering an MBMS notification from a base station to a mobile station. The MBMS notification includes information for directing the electronic device from the channels to the GAN. The MBMS notification also includes a GAN cell description for establishing an MBMS bearer for supporting the MBMS signaling over the GAN. The GAN cell description includes one or more of a generic cell identifier, a location identifier, a cell group identifier, a service identifier, and a session identifier.

During delivery of the MBMS notification, a paging request is transferred from a base station to a mobile station. The paging request includes at least one of a temporary group identifier, an MBMS session identifier, and an available MBMS bearer indicator on the GAN. The GAN cell description is then transferred from the base station to the mobile station to switch the mobile station from the channels to the generic network cell based on the GAN cell description.

In some embodiments, the GAN is replaced by a femtocell network. The femtocell network includes a femtocell, for example a long term evolution (LTE) femtocell, a wimax femtocell, a universal mobile telecommunication system (UMTS) femtocell, and a WiFi femtocell.

At step 720, the electronic device is directed to a GAN cell based on the delivered MBMS notification. On receiving the GAN cell description from the base station, the mobile station switches from the channels to the generic access cell indicated by the MBMS notification.

The method ends at step 725.

INDUSTRIAL APPLICABILITY

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of the present disclosure.

The invention claimed is:

1. A method for supporting multimedia broadcast multicast service over a generic access network, the method comprising:
    utilizing one or more channels to perform one or more application procedures in a multimedia broadcast multicast service (MBMS);
    transferring a paging request or a plurality of MBMS assignments from a base station to a mobile station;
    establishing a MBMS bearer for the MBMS over the generic access network by delivering, from the base station to the mobile station, an MBMS notification comprising generic access network cell description based on the paging request or the plurality of MBMS assignments, via the one or more channels; and
    directing an electronic device to switch the one or more channels to a generic access network cell based on the generic access network cell description and in response to the delivered generic access network cell description.

2. The method of claim 1, wherein each of the one or more channels is one of a global system for mobile communications edge radio access network (GERAN) channel, a universal mobile telecommunication system terrestrial radio access network (UTRAN) channel, a long term evolution (LTE) channel, a worldwide interoperability for microwave access (Wimax) channel.

3. The method of claim 1, wherein
    the paging request comprises at least one of a temporary group identifier, an MBMS session identifier, and an available MBMS bearer indicator on the generic access network.

4. The method of claim 1, wherein the electronic device is a multimedia device.

5. The method of claim 1, further comprising:
    transferring one or more channel requests from the mobile station to the base station;
    transferring an MBMS service request from the mobile station to the base station based on the one or more channel requests;
    wherein the plurality of MBMS assignments are transferred from the base station to the mobile station based on the MBMS service request.

6. The method of claim 1, wherein the generic access network is replaced by a femtocell network.

7. The method of claim 1, wherein the generic access network cell description comprises at least one of a generic cell identifier, a location identifier, a cell group identifier, a service identifier, and a session indicator.

8. A system for supporting multimedia broadcast multicast service over a generic access network, the system comprising:
    an electronic device;
    a mobile station for rendering a plurality of services to the electronic device; and
    a base station in communication with the mobile station for transferring a paging request or a plurality of MBMS assignments to the mobile station, establishing a MBMS bearer in the generic access network to support the multimedia broadcast multicast service by delivering, to the mobile station, an MBMS notification comprising generic access network cell description based on the paging request or the plurality of MBMS assignments, via one or more channels, and directing an electronic device to switch the one or more channels to a generic access network cell based on the generic access network cell description and in response to the delivered generic access network cell description.

9. The system of claim 8, wherein the generic access network is replaced by a femtocell network.

10. The system of claim 9, wherein the femtocell network comprises a femtocell, wherein the femtocell is one of a long term evolution femtocell, a universal mobile telecommunication system femtocell, and a WiFi femtocell.

* * * * *